(12) United States Patent
Visser

(10) Patent No.: US 10,563,635 B2
(45) Date of Patent: Feb. 18, 2020

(54) AFT ROTOR DUCTED WIND TURBINE

(71) Applicant: Kenneth D. Visser, Potsdam, NY (US)

(72) Inventor: Kenneth D. Visser, Potsdam, NY (US)

(73) Assignee: CLARKSON UNIVERSITY, Potsdam, NY (US)

( * ) Notice: Subject to any disclaimer, the term of this patent is extended or adjusted under 35 U.S.C. 154(b) by 295 days.

(21) Appl. No.: 15/355,859

(22) Filed: Nov. 18, 2016

(65) Prior Publication Data

US 2017/0138337 A1 May 18, 2017

Related U.S. Application Data

(60) Provisional application No. 62/397,137, filed on Sep. 20, 2016, provisional application No. 62/367,324, filed on Jul. 27, 2016, provisional application No. 62/256,974, filed on Nov. 18, 2015.

(51) Int. Cl.
*F03D 1/04* (2006.01)
*F03D 1/06* (2006.01)

(52) U.S. Cl.
CPC .............. *F03D 1/04* (2013.01); *F03D 1/06* (2013.01); *F05B 2240/133* (2013.01); *F05B 2240/221* (2013.01); *F05B 2250/324* (2013.01); *Y02E 10/721* (2013.01)

(58) Field of Classification Search
CPC ........ F03D 1/04; F03D 1/06; F05B 2240/133; F05B 2250/324; F05B 2240/221; Y02E 10/721
See application file for complete search history.

(56) References Cited

U.S. PATENT DOCUMENTS

| | | | |
|---|---|---|---|
| 3,339,078 A * | 8/1967 | Crompton | F03D 1/04 290/44 |
| 4,075,500 A | 2/1978 | Oman et al. | |
| 4,083,651 A * | 4/1978 | Cheney, Jr. | F03D 7/0224 416/11 |

(Continued)

FOREIGN PATENT DOCUMENTS

WO 0050769 8/2000

OTHER PUBLICATIONS

International Search Report Form PCT/ISA/220, International Application No. PCT/US2016/062827, pp. 1-9, dated Jan. 31, 2017.

*Primary Examiner* — Joseph J Dallo
(74) *Attorney, Agent, or Firm* — Bond Schoeneck & King, PLLC; George McGuire

(57) ABSTRACT

A wind energy extraction apparatus utilizing a separate surface enclosing the turbine rotor is disclosed. An embodiment of the present invention includes a slotted and unslotted duct of specified geometry enclosing a wind turbine rotor in such a manner as to provide acceleration of the ambient air though the rotor at a velocity above that which an open rotor exposed to the freestream would experience, thereby resulting in an increased amount of energy extraction relative to a comparable open rotor. In one aspect, the wind turbine rotor is positioned in the duct at a location downstream of the smallest cross-sectional area of the duct as this will provide the maximum power output. According to another aspect, the rotor geometry is such as to incorporate the effect of the duct on the incoming wind velocity profile.

14 Claims, 11 Drawing Sheets

(56) References Cited

U.S. PATENT DOCUMENTS

| | | | | |
|---|---|---|---|---|
| 4,368,007 | A * | 1/1983 | Ely | F03D 1/0608 416/121 |
| 4,781,523 | A * | 11/1988 | Aylor | F03D 1/04 415/218.1 |
| 8,251,638 | B2 * | 8/2012 | Boyd | F03D 1/04 415/1 |
| 9,000,604 | B2 | 4/2015 | Sireli et al. | |
| 9,261,073 | B2 | 2/2016 | Blake et al. | |
| 9,689,374 | B2 * | 6/2017 | Dixon | F03D 7/0224 |
| 2006/0067828 | A1 * | 3/2006 | Wetzel | F03D 1/0633 416/223 R |
| 2006/0216149 | A1 * | 9/2006 | Wilson | F01D 1/34 416/4 |
| 2006/0233635 | A1 * | 10/2006 | Selsam | F03D 1/065 415/4.3 |
| 2008/0012346 | A1 * | 1/2008 | Bertolotti | F03D 1/0658 290/55 |
| 2008/0150292 | A1 * | 6/2008 | Fedor | F03D 1/04 290/55 |
| 2010/0105512 | A1 * | 4/2010 | Berger | F03D 1/00 475/149 |
| 2010/0111697 | A1 * | 5/2010 | Wood | F01D 1/24 416/128 |
| 2010/0133838 | A1 * | 6/2010 | Borgen | F03D 1/06 290/52 |
| 2011/0031760 | A1 * | 2/2011 | Lugg | F03D 1/025 290/55 |
| 2011/0115228 | A1 * | 5/2011 | Stothers | F03B 3/04 290/52 |
| 2011/0142657 | A1 * | 6/2011 | Jacobsen | F03D 1/0658 416/204 R |
| 2011/0229312 | A1 * | 9/2011 | Frank | F16C 33/3806 415/170.1 |
| 2012/0034082 | A1 * | 2/2012 | Stimm | F03D 1/0641 416/117 |
| 2012/0080969 | A1 * | 4/2012 | Eriksen | H02K 1/2786 310/77 |
| 2012/0134840 | A1 * | 5/2012 | Leland | F03D 1/0691 416/244 R |
| 2014/0010651 | A1 * | 1/2014 | Nies | F03D 7/0268 416/1 |
| 2014/0064918 | A1 * | 3/2014 | Hurup | F03B 3/16 415/4.1 |
| 2014/0271216 | A1 * | 9/2014 | Syrovy | F03B 17/061 416/224 |
| 2015/0098820 | A1 * | 4/2015 | Dixon | F03D 7/0224 416/1 |
| 2016/0237987 | A1 * | 8/2016 | Manceau | F03D 7/0236 |
| 2016/0327028 | A1 * | 11/2016 | March Nomen | F03D 80/30 |
| 2017/0314529 | A1 * | 11/2017 | Mansberger | F03D 1/0625 |
| 2017/0350374 | A1 * | 12/2017 | March Nomen | F03D 80/30 |

* cited by examiner

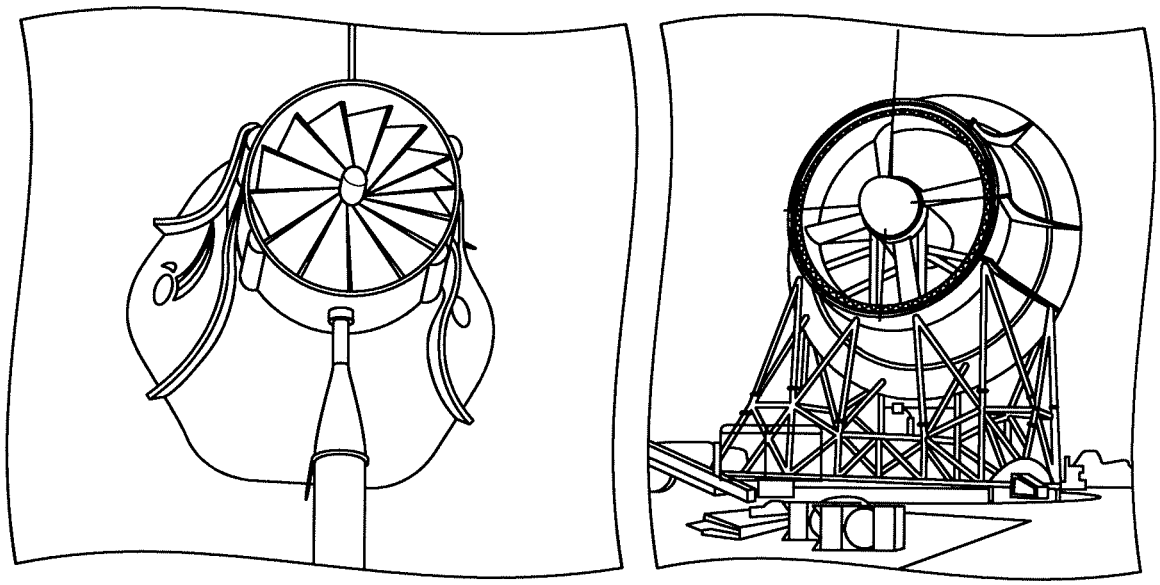
FIG. 3A
PRIOR ART
FIG. 3B
PRIOR ART
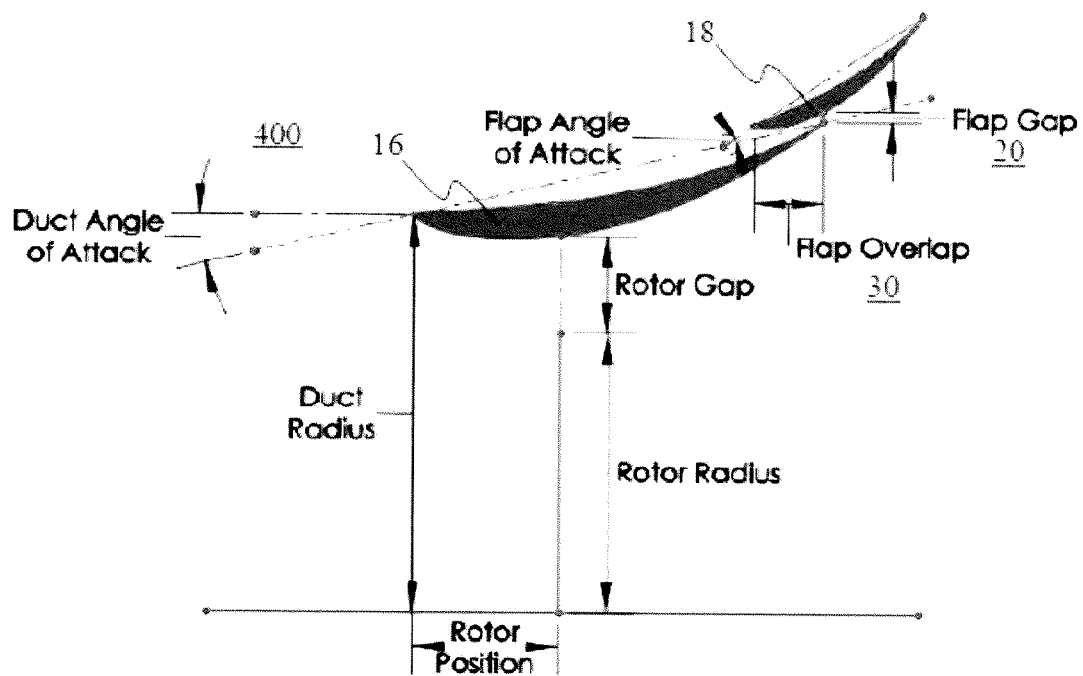
FIG. 4

FIG. 4
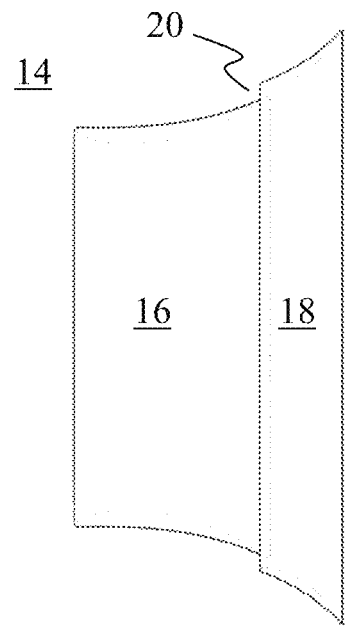
FIG. 5A
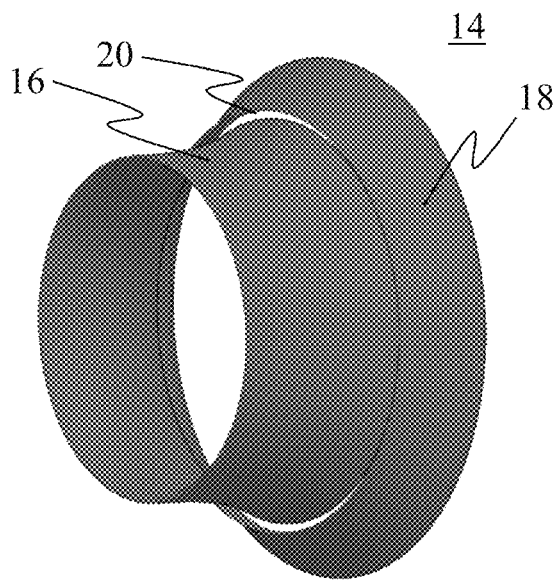
FIG. 5B
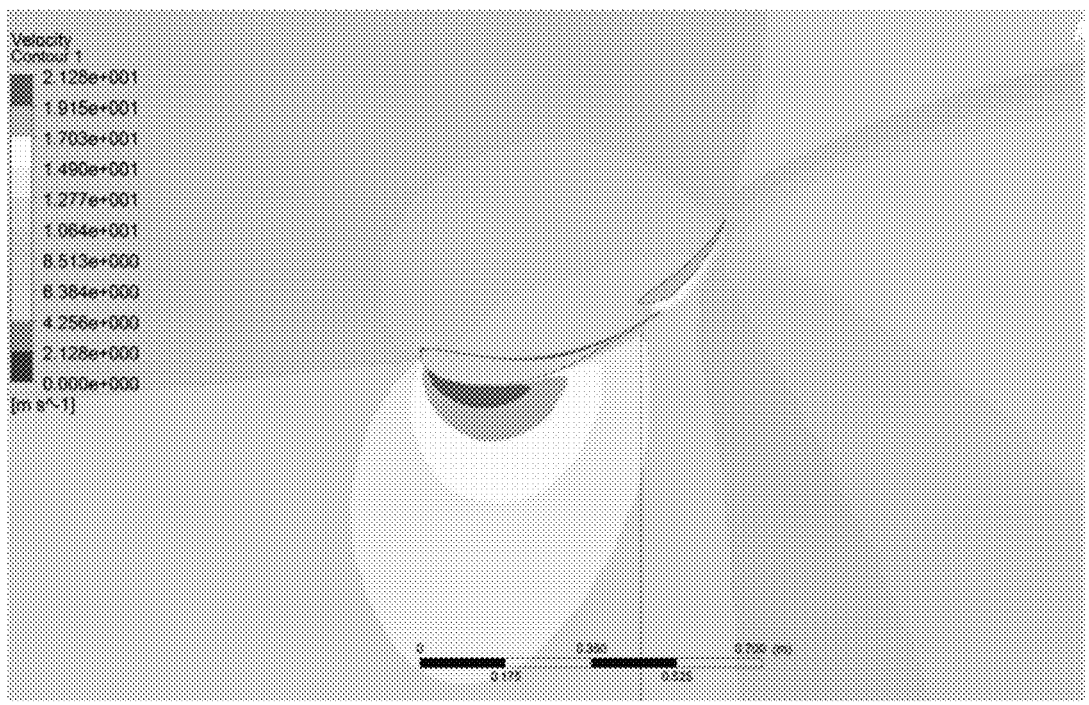
FIG. 6

AFT ROTOR DUCTED WIND TURBINE

REFERENCE TO RELATED APPLICATION

The present application relates and claims priority to U.S. Provisional Application Ser. No. 62/256,974, filed Nov. 18, 2015, Ser. No. 62/367,324 filed Jul. 27, 2016, and Ser. No. 62/397,137 filed Sep. 20, 2016, the entirety of each of which is hereby incorporated by reference.

BACKGROUND

1. Field of Invention

The present invention relates generally to wind extraction apparatus, and more particularly to wind extraction apparatus utilizing a ducted wind turbine with the rotor positioned aft of a converging section of the duct and incorporating a unique rotor design which accounts for the flow field created by the duct.

2. Background of Art

The proposed invention pertains to the increasing need for renewable, sustainable and green energy sources. Wind energy has long been acknowledged as having vast potential to fulfill these needs. The wide adoption of small wind energy has been hampered by higher unit costs and lower efficiency and the described concept seeks to alleviate this difference.

Ducted wind turbines (DWTs) are created by enclosing a conventional horizontal axis wind turbine (HAWT) with a duct, which can be an aerodynamic curved surface or ideally, an airfoil revolved around the rotor axis. The presence of the duct increases the mass flow rate and velocity through the turbine. In a paper by Foreman, K. M., Gilbert, B. L., and Oman, R. A., "Diffuser Augmentation of Wind Turbines", Journal of Solar Energy, Vol. 20, No. 4, April 1978, pp. 305-311, these ducted turbines were extensively tested in the 1970's and 1980's, and it was proposed that this improvement in performance occurred because the duct reduces the pressure behind the turbine, relative to that behind a conventional wind turbine, causing more air to be drawn through. Hanson proposed in 2008 that it is the lift generated by the shroud, as shown by de Vries in 1979 that induces an increased mass flow through the rotor, resulting in an increase in the power coefficient proportional to the mass flow. For either position, the presence of the duct increases the mass flow rate and, consequently, the power output of the turbine. The duct captures a much larger stream tube than an open rotor configuration and a substantial increase in velocity, exceeding even the free stream, is observed at the rotor face.

The theoretical maximum open rotor power extractable from the wind, based on a streamtube the diameter of the rotor, is 59.3% and is known as the Betz limit. The power coefficient is thus defined as:

$Cp$=power extracted/power in the wind=$2P/\rho\pi R^2 V^3$ where $Cp_{max}=Cp_{Betz}=0.593$, and R=rotor radius. With an increased mass flow rate and velocity, a DWT increases the amount of generated power and Cp values can exceed the Betz limit when based on the rotor area $R^2$. Gilbert and Foreman suggested that they could have a Cp of 1.57, leading to an 'augmentation ratio' of $Cp_{DWT}/Cp_{Betz}=2.65$. Many studies have investigated the feasibility and associated augmentation factors seen in DWTs [Hu et al, 2008; Igra O., 1976, 1984; Hansen et al, 2000; Werle and Presz 2008; Van Bussel, 2007; Oman, 1977; Leoffler, A. L. and Vanderbilt, 1978; Riegler, 1983; Politis and Koras, 1995] with the largest prediction of 7 by Badawy and Aly [2000], however conclusions have been quite varied. Werle and Presz [2008] used fundamental momentum principles and concluded that the possible augmentation factor could only approach 2, and that earlier studies had incorrect assumptions, leading to overly optimistic predictions. Hansen [2000] has published viscous CFD results that predicted ideal Cp values approaching 0.94, and an augmentation factor of 1.6. He also indicated that if the duct geometry could be made to keep the flow attached, the augmentation factor could be improved further. This potential increase in power generation has driven research into DWTs, however to date, no scaled-up experimental design has been able to realize these augmentation factors and no commercially viable DWT has been successful. A good example of this type of failure is seen in the Vortec 7 from New Zealand. [Phillips et al, 2003].

DWTs have been proposed to offer additional advantages to the increased mass flow augmentation, such as minimizing tip losses and being less yaw sensitive to ambient winds than HAWTs. Studies of DWTs at Clarkson University, [Moeller and Visser, 2010; Venters, 2014] have indicated Cp values, based on the rotor area, above 1.1 and additional design benefits such as acoustic signature reduction and no tail requirements. Perhaps, best of all, is that the overall potential for higher energy extraction at lower speeds opens up many more areas of the country to a viable distributed wind energy solution.

In order to extract this increased power, a wind turbine rotor is required in the same manner as an open rotor. Most rotor designs seek to exploit the high velocity at the duct, however the presence of the rotor itself actually modifies the velocity where it is stationed and the duct itself modifies the velocity field the rotor sees such that the optimum blade design for the rotor is not that which would be required of an open rotor. In fact, it is quite different in planform shape and in twist, due to the presence of the flowfield generated by the duct.

An example of an arrangement to exploit the use of a duct in such a manner is described in U.S. Pat. No. 7,018,166 where a rotor is placed at the throat of the duct, wherein the velocity is the highest. In this description, an additional second rotor is placed downstream of the duct, termed the free rotor, but is driven by the flow external to the duct, not the internal flow field. This and other similar descriptions seek to exploit the high velocity at the duct throat, however the optimum arrangement for maximum power extraction of a given ducted turbine is a rotor positioned downstream of the throat, as will be noted in the present description.

SUMMARY OF THE INVENTION

In one embodiment, the present invention contemplates a design variation on the ducted wind turbine concept that uses a slotted duct system to augment the wind flow, increasing the mass flow and velocity through the turbine rotor. One aspect of the current invention is a design with the rotor located inside but aft in the duct, namely downstream of the narrowest part of the duct, which extracts significant energy from the wind. According to another aspect, the main, or forward piece of the duct is larger than the aft or 'flapped' section of the duct, similar to the high lift systems employed on conventional aircraft.

In one aspect of the invention, the optimum rotor placement that yields the highest power output for the rotor is towards the aft region edge of the duct, not in the narrowest cross-sectional area, or highest velocity position.

In another aspect of the invention, by defining the power coefficient, not in terms of the swept rotor area, but instead by projected frontal area, (PFA), an equivalent "Betz coefficient" can be computed for a ducted turbine that can be compared directly to an open rotor turbine. In one embodiment, the present invention's duct had a PFA of 6.6 m2. Non-dimensionalizing by this, instead of by the rotor area, yields an equivalent "Betz value" of CpPFA=0.647. Thus, the optimized DWT design produced enough power to exceed the 59.3% limit for power extraction, that is, a wind turbine with a swept area as large as the PFA of the DWT. In fact, an open wind turbine would require a rotor diameter of 3.03 m, with an area of 7.2 $m^2$, in order to produce the same power as the ducted turbine rotor of 2.1 m diameter and area of 3.34 $m^2$.

In experimental testing, an embodiment of the present invention has reached a value of 0.98, more than 65% above that of the open rotor theoretical maximum, the Betz Limit of 0.593.

In another aspect of the invention, the present invention provides a design variation on the rotor geometry utilized in a ducted wind turbine. One aspect of the present blade invention is a design that incorporates the non-uniform flow field that is created by the duct itself. In this regard, two observations have been made: First, the resulting optimum rotor shape is twisted in a manner that is different from an open rotor in a uniform flow field. The flow field from the duct contains a non-uniform axial velocity distribution and this changes what the optimum twist distribution on the blade should be. The second is that the optimally designed blade contains a chord distribution which, at a particular radius, increases radially towards the tip, as opposed to continually decreasing in chord like a conventional un-ducted rotor.

In accordance with an aspect is a wind energy power generating device. The device includes: a duct extending a predetermined distance along a longitudinal axis and comprising: (i) a forward lifting surface having a first leading edge extending in a first plane transverse to said longitudinal axis and a first trailing edge extending in a second plane that is laterally spaced from and parallel to said first plane and being of a first maximum diameter that is positioned in said second plane coincident with said first trailing edge and a first minimum diameter that is positioned in a third plane that is parallel to and spaced between said first plane and said second plane; and (ii) an aft lifting surface having a second leading edge extending in a fourth plane that is parallel to and spaced laterally from said second plane and a second trailing edge extending in a fifth plane that is parallel to and laterally spaced from said fourth plane and being of a second minimum diameter less than said maximum diameter, said forward lifting surface and said aft lifting surface being concentrically mounted in concentrically spaced relation to one another and with said fourth plane positioned between said first and second planes and said fifth plane positioned aft of said fourth plane; and a rotor mounted within said duct for rotation about said longitudinal axis and positioned aft of said first minimum diameter.

According to an embodiment, the rotor is positioned between said first minimum diameter and 70% of said predetermined distance.

According to an embodiment, the rotor is positioned between 55% and 65% of said predetermined distance as measured from said first leading edge.

According to an aspect is a wind energy power generating device. The device includes: a duct extending a predetermined distance along a longitudinal axis and comprising a forward lifting surface having a first leading edge extending in a first plane transverse to said longitudinal axis and a first trailing edge extending in a second plane that is laterally spaced from and parallel to said first plane and being of a first maximum diameter that is positioned in said second plane coincident with said first trailing edge and a first minimum diameter that is positioned in a third plane that is parallel to and spaced between said first plane and said second plane; and a rotor mounted within said duct for rotation about said longitudinal axis and positioned between said second and third planes.

According to an aspect is a turbine device. The turbine device includes: (i) a first circular duct extending along a longitudinal axis from a leading edge to a trailing edge and comprising an outer surface and an inner surface, a diameter of the inner surface increasing from a minimum diameter near the leading edge to a maximum diameter near the trailing edge; and (ii) a rotor mounted within the first circular duct and configured to rotate about the longitudinal axis, wherein the rotor is mounted at a position within the first circular duct wherein the diameter of the inner surface is greater than the minimum diameter.

According to an embodiment, the device further comprises a second circular duct extending along the longitudinal axis from a second duct leading edge to a second duct trailing edge and comprising an outer surface and an inner surface, wherein at least a portion of the first circular duct trailing edge is positioned within the second duct leading edge, and wherein a diameter of the inner surface of the second duct leading edge is greater than a diameter of the outer surface of the first duct, thereby creating a gap between the outer surface of the first circular duct and the inner surface of the second circular duct.

According to an embodiment, the rotor is positioned in front of the trailing edge of the first duct.

According to an aspect is a duct assembly. The duct assembly includes a first circular duct extending along a longitudinal axis from a leading edge to a trailing edge and comprising an outer surface and an inner surface, a diameter of the inner surface increasing from a minimum diameter near the leading edge to a maximum diameter near the trailing edge, wherein the duct is configured for a rotor to be mounted within the duct to rotate about the longitudinal axis, at a position within the first circular duct wherein the diameter of the inner surface is greater than the minimum diameter.

According to an embodiment, the assembly further includes a second circular duct extending along the longitudinal axis from a second duct leading edge to a second duct trailing edge and comprising an outer surface and an inner surface, wherein at least a portion of the first circular duct trailing edge is positioned within the second duct leading edge, and wherein a diameter of the inner surface of the second duct leading edge is greater than a diameter of the outer surface of the first duct, thereby creating a gap between the outer surface of the first circular duct and the inner surface of the second circular duct.

These and other aspects of the invention will be apparent from the embodiments described or otherwise envisioned herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3A is an image of a prior art turbine, a WINDTAMER® turbine.

FIG. 3B is an image of a prior art ducted rotor, a Vortec 7.

FIG. 4 is a schematic representation of a cross-sectional view of a slotted ducted wind turbine with the rotor mounted in the throat area of the duct and geometric details, in accordance with an embodiment.

FIG. 5A is a schematic representation of a side view of an optimized slotted duct geometry, in accordance with an embodiment.

FIG. 5B is a schematic representation of a perspective side view of an optimized slotted duct geometry, in accordance with an embodiment.

FIG. 6 is a graph of a velocity flow field solution for a optimized slotted ducted wind turbine, in accordance with an embodiment.

DETAILED DESCRIPTION

Figure 1:
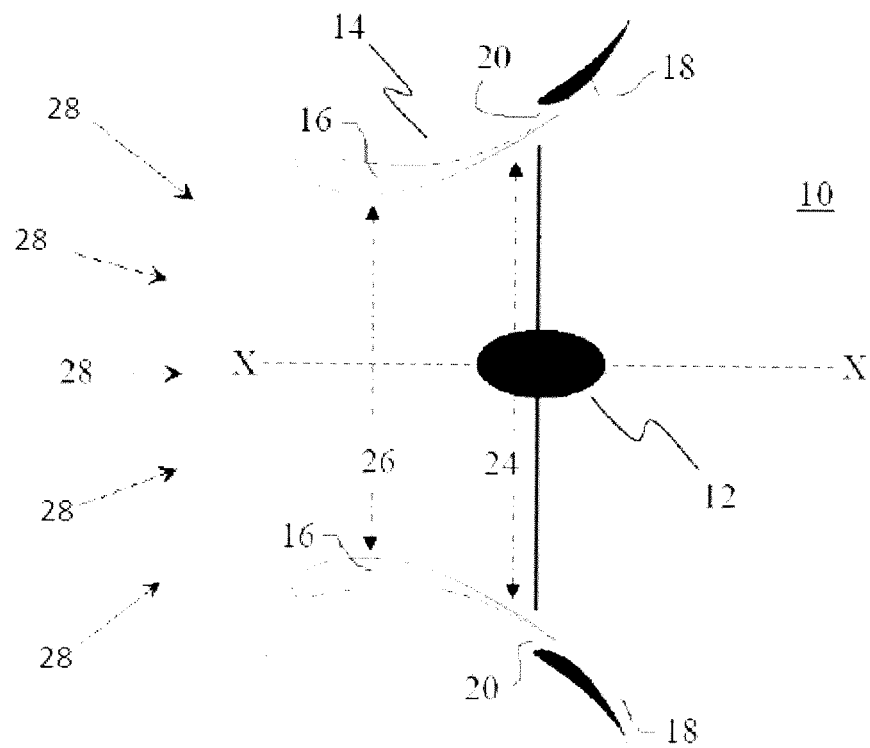
FIG. 1 is a schematic representation of a cross-sectional view of an aft rotor slotted duct wind turbine concept, in accordance with an embodiment.

With reference to FIG. 1, an embodiment of the current wind energy extractor 10 is depicted as comprising main rotor 12 mounted within a duct 14 comprised of a forward section 16 optionally, and a concentrically positioned aft section or sections 18 separated by a respective slot or gap 20. Preferably, the cross-sections of forward section 16 and aft section 18 are airfoils selected based upon high lift characteristics at low speeds; there are several well-known airfoils that could be selected for use. A rotor 12 is positioned with its central axis co-axial with the duct centerline X-X and attached to a rotor housing containing electrical conversion equipment, and located in a wider section of the duct 24, aft a predetermined distance (selected based predominantly on prevailing wind speed at installation site, as well as airfoil characteristics) of the narrowest constriction 26 of the duct 14. The wind is depicted at 28, being drawn in the front of the assembly.

Figure 2:
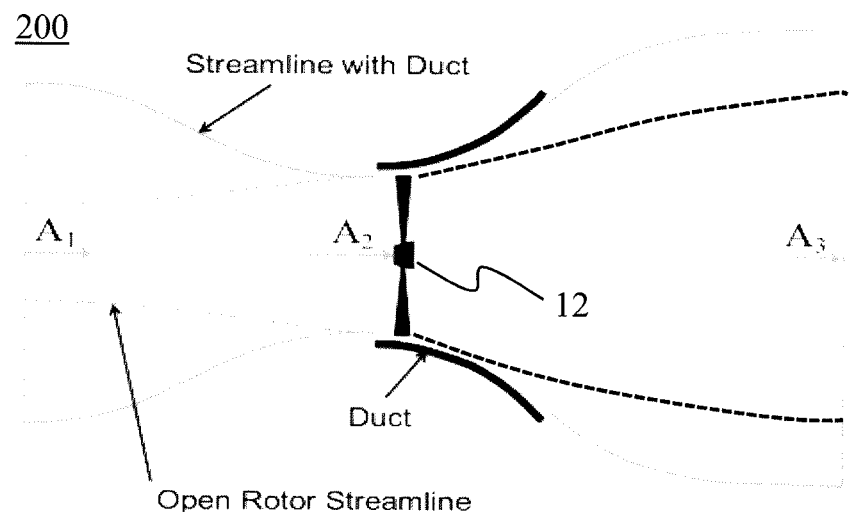
FIG. 2 is a schematic representation of a sectional elevation view of a prior art ducted rotor flow field illustrating the nature of the increase of captured wind in the presence of a duct.

An illustration of the influence of a prior art duct and rotor system 200 in which the rotor 12 is mounted at the narrowest point of the throat within the duct, and the associated wind flow field can be seen in FIG. 2. The presence of the duct serves as a means to increase both the amount of wind channeled through the turbine rotor and the velocity at the rotor face. An ideal open rotor (non-ducted) configuration slows down the upstream wind speed to ⅔ of the upstream value. The presence of the duct increases the rotor face velocity, according to calculations and experimental measurements, to a value of or exceeding the upstream velocity. Thus, as the power in a given wind stream is proportional to the velocity cubed, the wind power seen by the rotor can be increased by a factor of 27/8, more than a factor of 3.

FIG. 3A is an image of a WINDTAMER turbine, and FIG. 3B is an image of a Vortec 7 turbine. Both represent prior art, ducted wind turbine concepts that fail to provide a sufficient output, and hence are not commercially viable. As can be observed from FIGS. 3A and 3B, the rotor of each system is mounted in the narrowest cross-section of the duct.

Referring to FIG. 4, in one embodiment, is a turbine system 400 illustrating the geometry of a slotted duct design. Many different values and measurements are possible, but according to one embodiment, the design comprises the following values:

Main duct surface=1.0 meter;
Secondary duct surface or flap=0.5 meter;
Main surface angle of attack=10°;
Flap angle of attack=34° (24° relative to main lifting surface);
Gap Ratio=0.034 (ratio of rotor diameter to duct diameter at rotor location);
Rotor Position=59% of duct length;
Flap Gap=0.023 m;
Flap Overlap=0.149 m; and
Rotor diameter of approximately 2.0 meters.

Hence, the fineness ratio of the DWT, or the ratio of length to diameter, is approximately 0.60, according to this particular embodiment. It should be noted that the purpose of these geometrical details is not to define absolute numbers, but rather to demonstrate an example value from a range of possible values for an aft mounted rotor. As noted above, many other values and measurements and physical relationships between the components are possible.

As shown in FIG. 4, the duct comprises at least two portions, a forward section 16 and a concentrically positioned aft section 18, separated by a respective slot or gap 20, labelled a "Flap Gap" in FIG. 4. According to an embodiment there is an overlap 30, labelled "Flap Overlap" in FIG. 4, between the distal end of forward section 18 and the proximal end of aft section 20.

Similarly, referring to FIGS. 5A and 5B, for example, are schematic representations of a portion of duct 14 of a turbine system 200, in accordance with an embodiment. Duct 14 comprises a forward section 16 and a concentrically positioned aft section 18, separated by a respective slot or gap 20. In this embodiment, the forward section 16 and aft section 18 of duct 14 comprise an overlapping region, meaning that a distal portion (relative to the wind source) of the forward section 16 comprises a diameter smaller than the diameter of the proximal portion (relative to the wind source) of the aft section 18 of the duct, and that this distal portion of the forward section is positioned slightly within the diameter of the aft section. According to an embodiment, the distal portion of the forward section 16 is centered within the proximal portion of the aft section 18, as shown in FIG. 5B.

Referring to FIG. 6, in one embodiment, is a graph of the flow field within and around the duct of a turbine system with a slotted duct design. The turbine system may be, for example, design 10 in FIG. 1 and/or design 400 in FIG. 4, or any of the other embodiments described or otherwise envisioned herein. According to an embodiment, the slotted duct design augments the maximum power production of a similar sized optimized open rotor wind turbine by a factor of 2.16, yielding a Cp of 1.28.

Figure 7A:
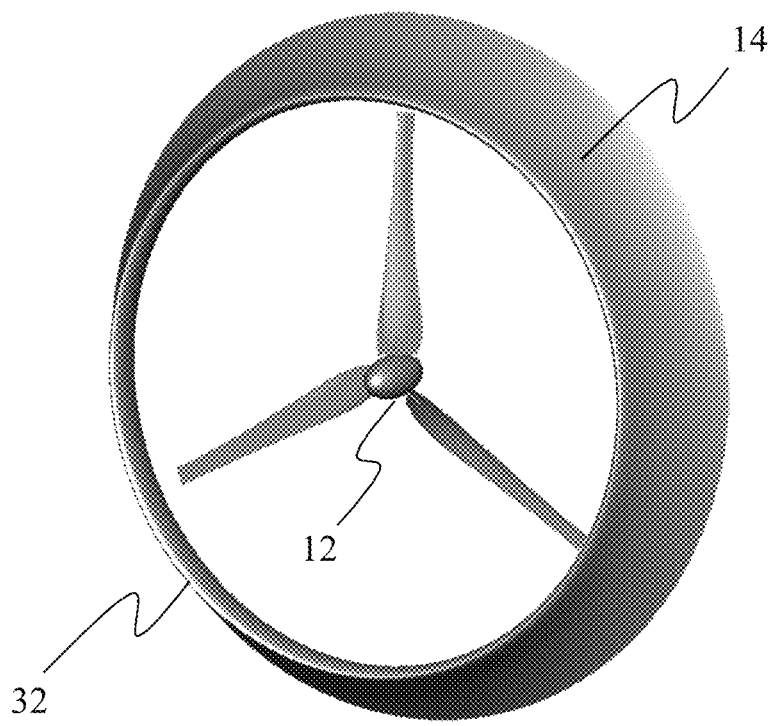
FIG. 7A is a schematic representation of a rotor geometry for a non-slotted turbine configuration, in accordance with an embodiment.
Figure 7B:
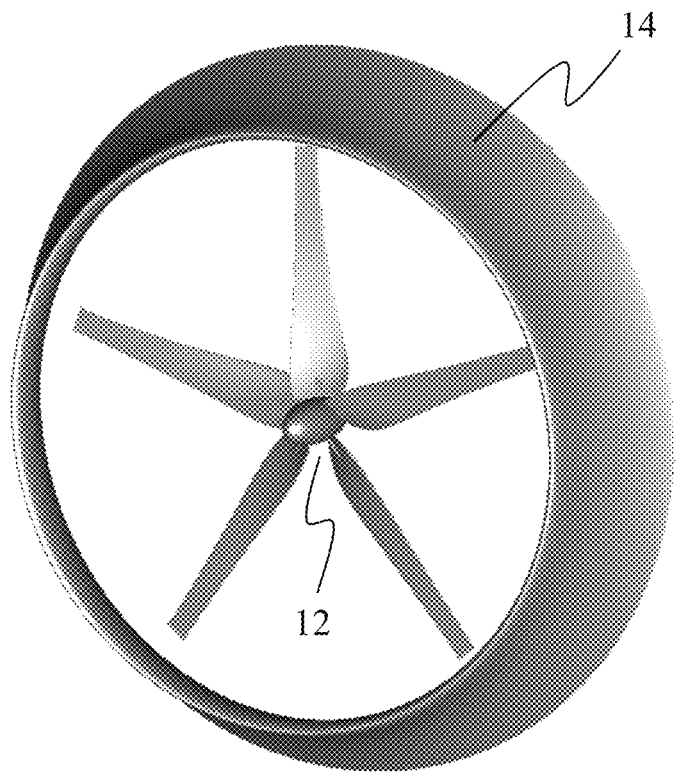
FIG. 7B is a schematic representation of a rotor geometry for a non-slotted turbine configuration, in accordance with an embodiment.

Referring to FIGS. 7A and 7B are schematic representations of an un-slotted duct design for a turbine system. A portion of a duct 14 is shown, with a rotor 12. As shown in the figures, although the rotor 12 is centered or approximately centered within the duct 14, it is not located at the narrowest portion of the duct, which could be, for example, the leading edge 32 of the duct 14. Rather, the rotor 12 is centered or approximately centered within the duct 14 at a position aft of the narrowest portion. In the case of the illustrated design, the following values were used as a basis for the optimized experimental duct design, but represent a range of possible values:

Main duct surface=0.625 meter;
Main surface angle of attack=25°;
Rotor Position=21% of duct length; and
Rotor diameter of 2.5 meters.

Hence the fineness ratio of the DWT, or the ratio of length to diameter, is approximately 0.25. It should be noted that the purpose of these geometrical details is not to define absolute numbers, but rather to demonstrate an example value from a range of possible values for an aft mounted rotor. Many other values and measurements and physical relationships between the components are possible.

Figure 8:
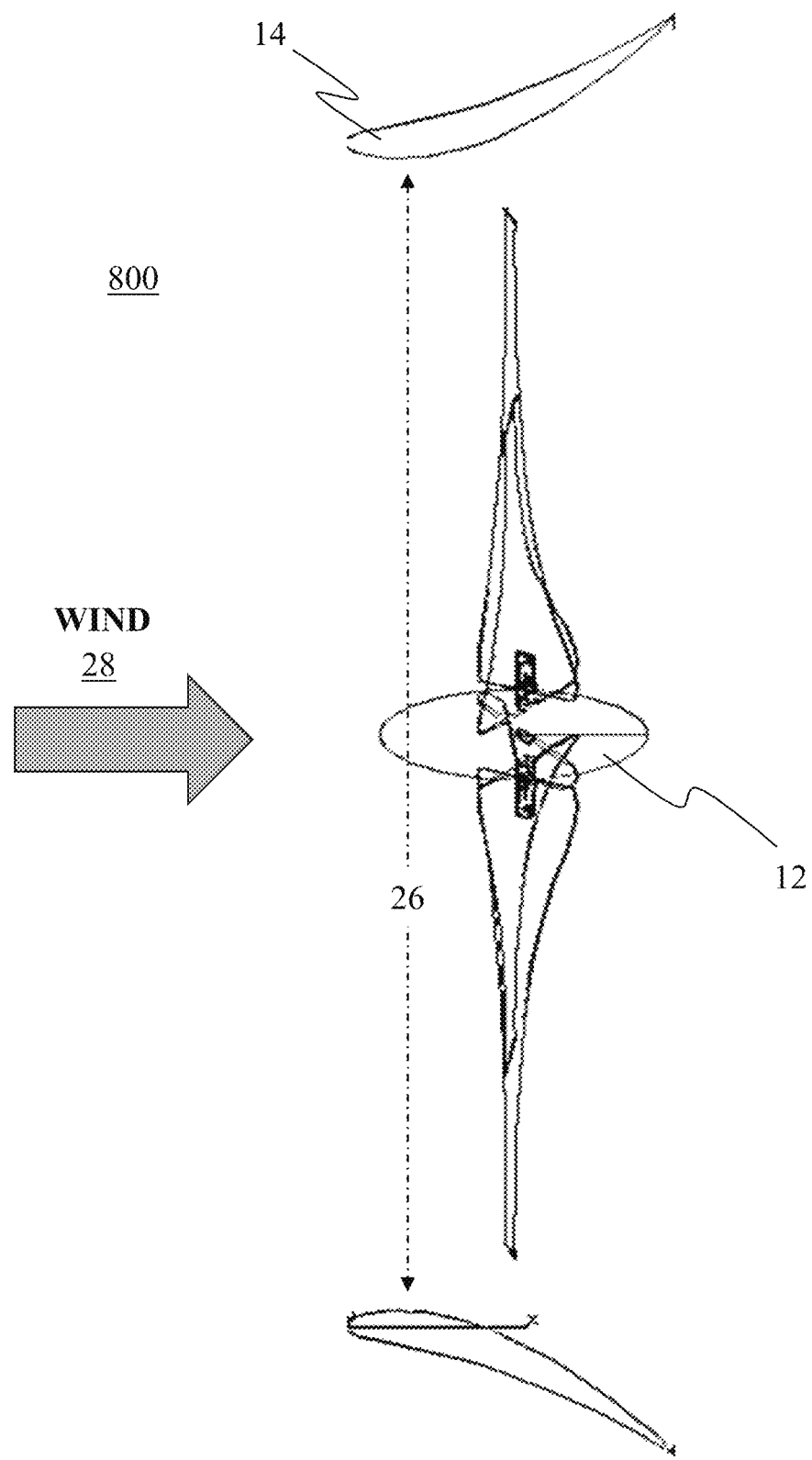
FIG. 8 is a schematic representation of a sectional view of a single surface configuration illustrating the aft rotor position in the duct, in accordance with an embodiment.

Referring to FIG. 8, in one embodiment, is a schematic representation of a portion of a turbine system 800. Turbine system 800 comprises a duct 14, which may be an un-slotted or slotted duct, and a rotor 12. As in other designs described or otherwise envisioned herein, the turbine 12 is located aft of the narrowest portion of the duct. As shown in FIG. 8, the narrowest portion of the duct is denoted by dotted line 28.

Figure 9:
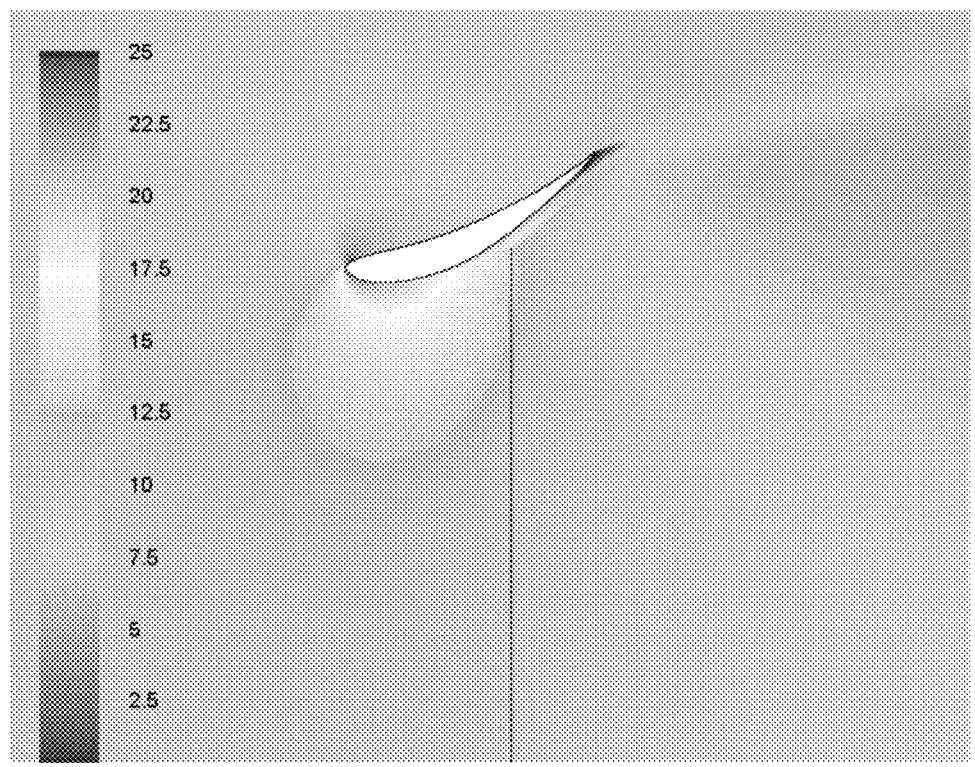
FIG. 9 is a graph of a computational velocity flow field solution for a non-slotted ducted turbine, highlighting the aft position of the rotor in the duct, in accordance with an embodiment.

Referring to FIG. 9, in one embodiment, is a graph of a flow field solution for an optimized un-slotted turbine system design. The visual changes represent velocity flow field variation and it can be seen that the velocity increases closer to the interior surface of the duct. The graph shows the upper half of the duct geometry, which is mirrored about the central axis (just below the lower edge of the graph, for example). This design augments the maximum power production of a similar sized optimized experimental open rotor wind turbine by a factor of more than 2, yielding a Cp of approximately 1.0. Further details, along with the experimental data substantiating this configuration are presented in the following paragraphs.

Figure 10:
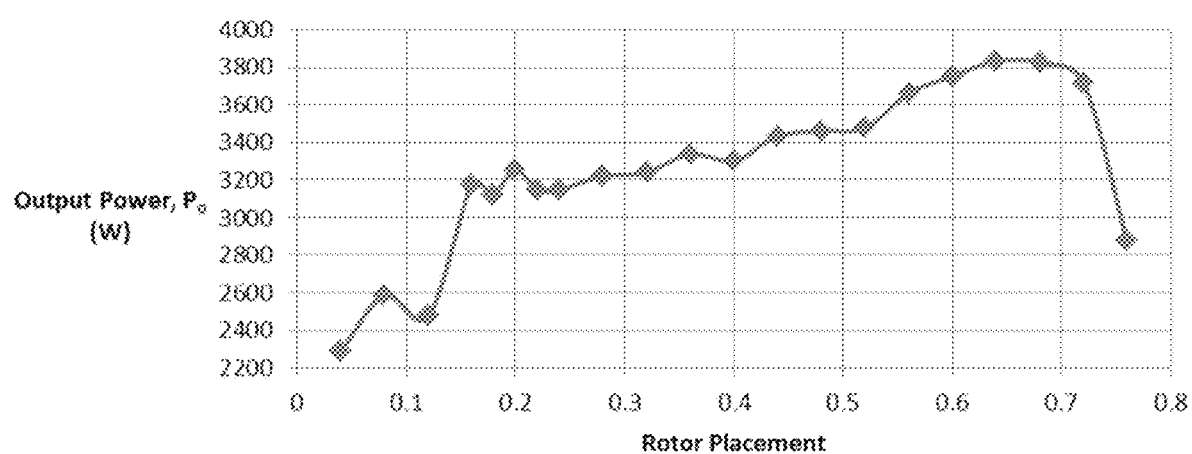
FIG. 10 is a graph of the effect of rotor position in the duct on the resulting output power, in accordance with an embodiment.

Referring to FIG. 10, in one embodiment, is a graph of the effect of rotor placement within a duct, as determined by numerical computational results. As is shown in FIG. 10, the output power of the turbine system increases as the rotor is placed further and further aft of the narrowest portion of the duct. For example, a location of 0.14 represents the narrowest portion of the forward airfoil, potentially the leading edge of the airfoil, and a location of 0.79 of the duct length represents the trailing edge of the forward airfoil. According to this embodiment, the highest output power of 3,833.3 W was found at a location of 0.64 of the duct length. While various output power variations, and the optimal placement of the rotor, will depend on the specific duct, rotor, and turbine design, the graph demonstrates that placing the rotor aft of the narrowest portion of the duct increases the output power of the turbine system.

Figure 11:
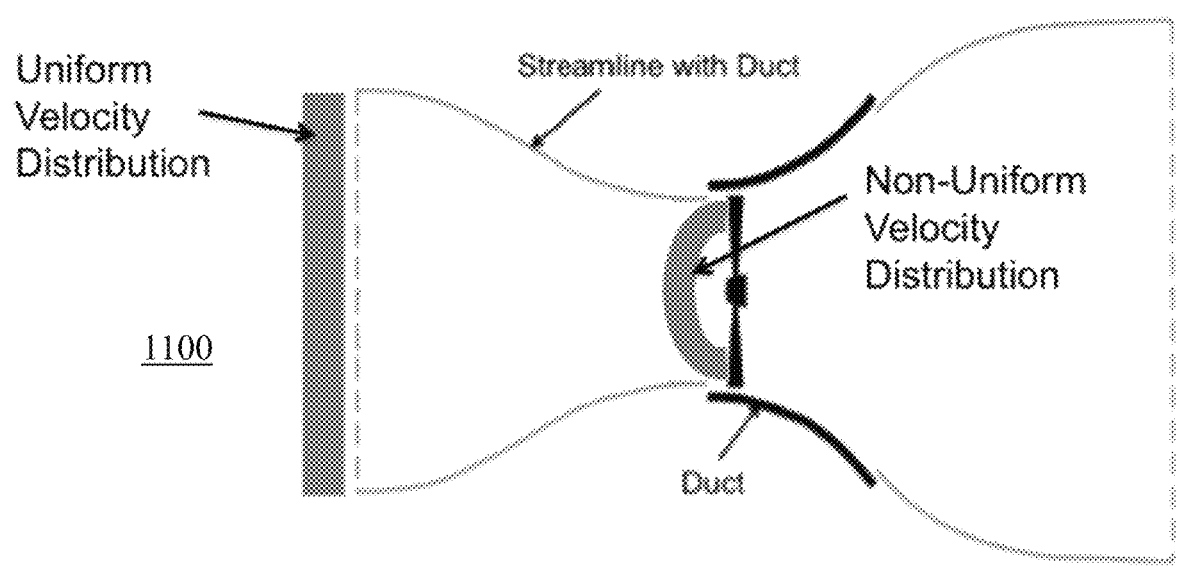
FIG. 11 is a schematic representation of a cross-sectional view of a ducted wind turbine illustrating the non-uniform flow field of the duct at the location of the rotor, in accordance with an embodiment.

Referring to FIG. 11, in one embodiment, is a turbine system 1100. According to this embodiment of a turbine system, the axial velocity at the rotor becomes non-uniform for a ducted wind turbine once the wind reaches the rotor in the duct. Since the design of the turbine blade depends upon knowing this distribution, utilizing a uniform wind profile, such as is done for open rotor cases, to design the blade would lead to a less efficient geometry.

Figure 12:
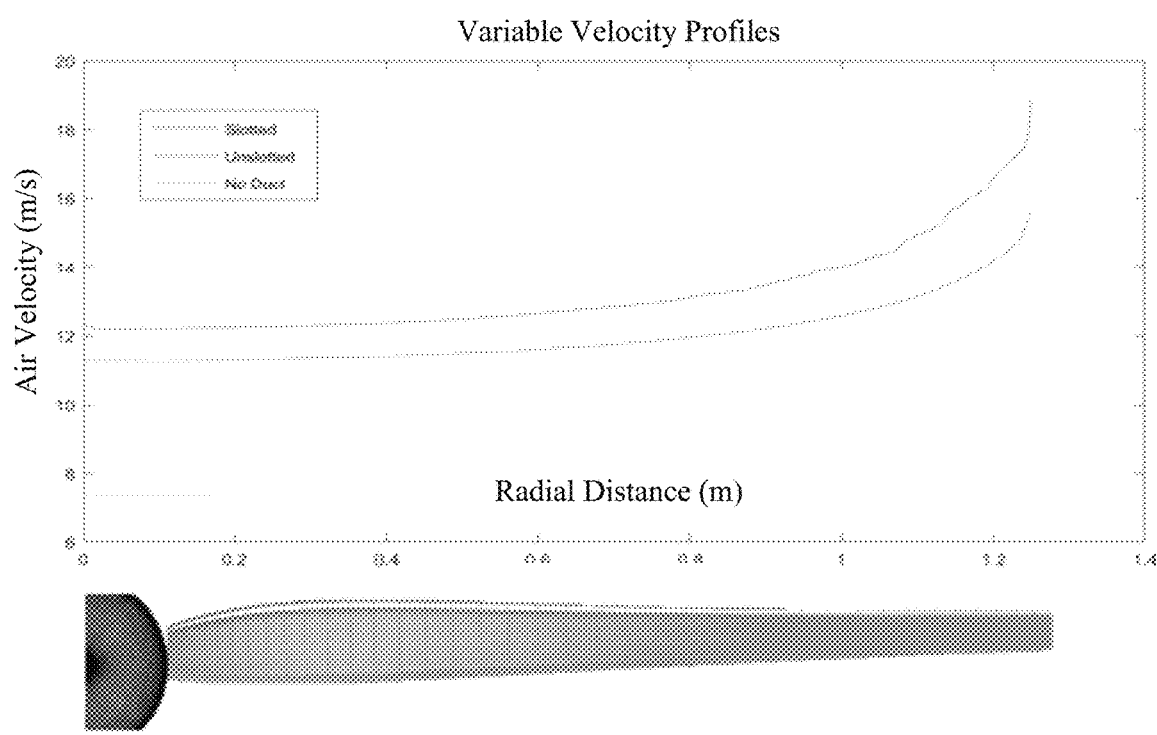
FIG. 12 is a graph of the effect of the variable axial velocity on the optimized twist distribution along the blade, in accordance with an embodiment.

Referring to FIG. 12, in one embodiment, is a graph of the variation of axial velocity along the rotor blade comparing ducted and un-ducted velocities. The un-ducted, or open rotor case, is simply a straight line, occurring at a velocity of about 7.5 m/s and indicating a uniform incoming, or axial, velocity along the entire length of the blade. Two additional profiles are illustrated for the velocity once the rotor is enclosed by the duct. Each represents different duct geometries, but both illustrate the same effect, namely that the axial velocity that the blade sees increases overall and increases in magnitude towards the blade tip, located towards the interior of the duct, as the duct wall is approached. This serves, in the overall sense, to increase the power available to the rotor to be extracted, and thus requires a different blade design, even if it were uniform, when compared to an open rotor, and as such the variation requires yet a further modification in the geometry to enable the blade to extract the most energy it can. Not accounting for this change in the incoming velocity profile leads to a blade design that is less efficient than it could be even if FIG. 13 is a sketch of the optimized planform for an example ducted velocity field, illustrating the geometrical differences highlighted in FIGS. 6 and 7.

Figure 13:
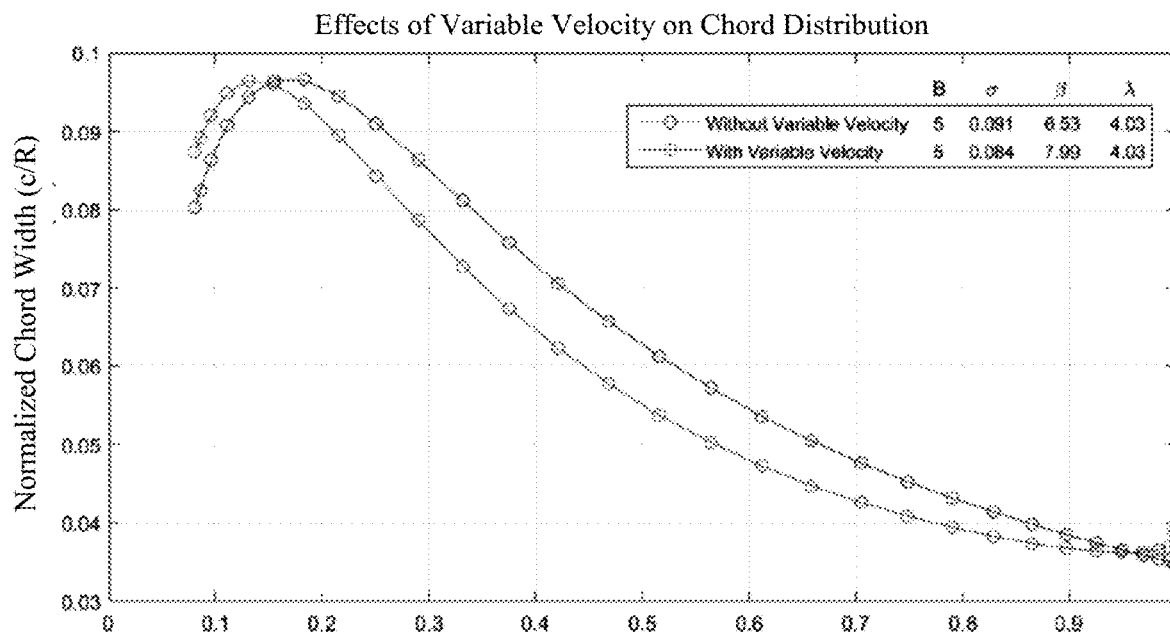
FIG. 13 is a graph of the variation of the blade planform chord distribution with radial distance along the blade, in accordance with an embodiment.

Referring to FIG. 13, in one embodiment, is a graph of the variation of blade planform chord distribution with radial distance along the blade, comparing the results for ducted and un-ducted velocity flow fields. It can be noted that the chord is reduced over the majority of the blade, but increases in the tip region. This aspect of the optimized design is unique to the ducted flow field modified axial velocity distribution and is not present on open rotor designs. Hence simply enclosing an open rotor design without said tip chord geometry results in a lower performance rotor.

Figure 14:
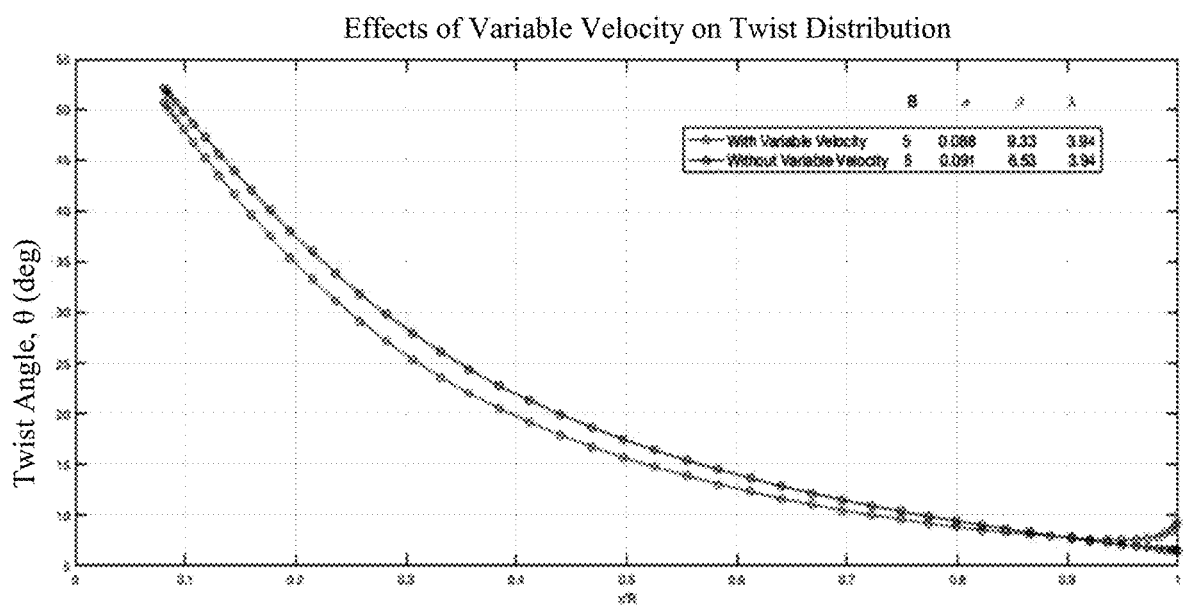
FIG. 14 is a graph of the variation of the blade planform twist distribution with radial distance along the blade, in accordance with an embodiment.

Referring to FIG. 14, in one embodiment, is a graph of variation of the blade planform twist distribution with radial distance along the blade, comparing the results for ducted and un-ducted velocity flowfields. It can be noted that the twist is reduced over the majority of the blade, but increases in the tip region. This aspect of the optimized design is unique to the ducted flow field modified axial velocity distribution and is not present on open rotor designs. Accordingly, simply enclosing an open rotor design without said twist distribution results in a lower performance rotor.

Figure 15:
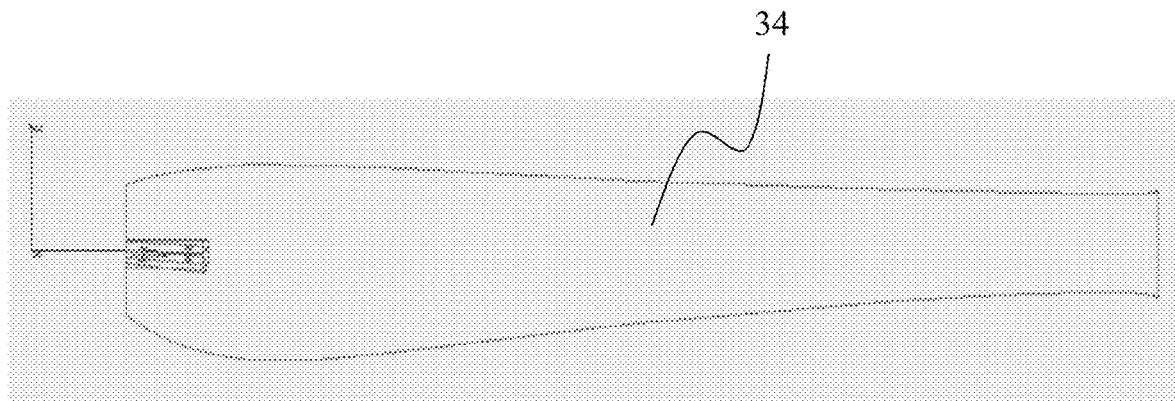
FIG. 15 is a schematic representation of an optimized planform for an example ducted velocity field, in accordance with an embodiment.
Figure 16:
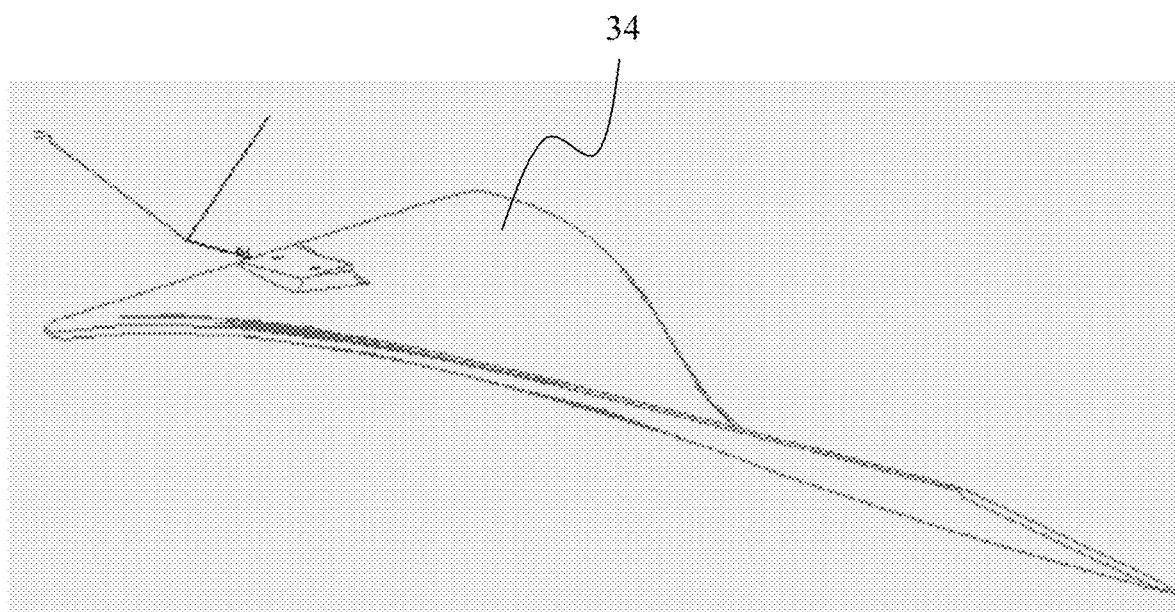
FIG. 16 is a schematic representation of an optimized planform for an example ducted velocity field, illustrating the variation in twist, in accordance with an embodiment.
Figure 17:
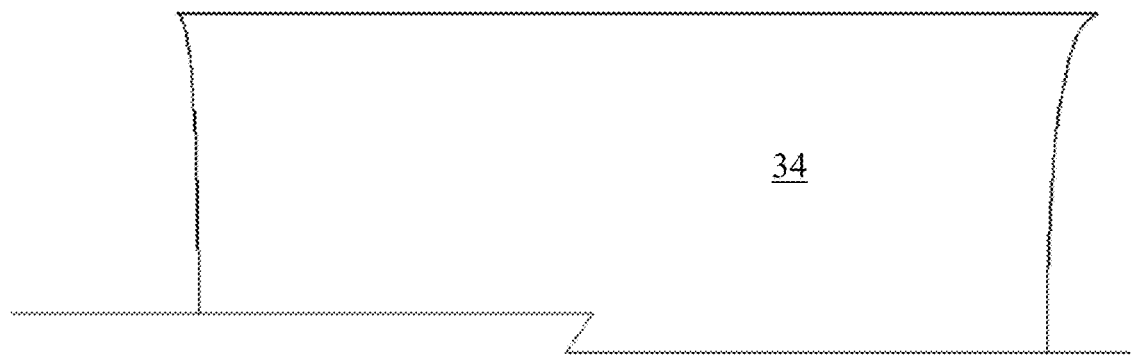
FIG. 17 is a schematic representation of tip geometry of an optimized rotor blade, in accordance with an embodiment.

Referring to FIGS. 15 and 16, in various embodiments, are a blade 34 which are optimized for a ducted velocity field. These blades illustrate the geometrical differences highlighted in FIGS. 13 and 14, most notably those in the tip region. Similarly, referring to FIG. 17, in one embodiment, is a schematic representation of the planform geometry in the tip region of a blade 34 that illustrates the increase in the chord towards the tip region as a result of the influence of the duct flow field.

Figure 18:
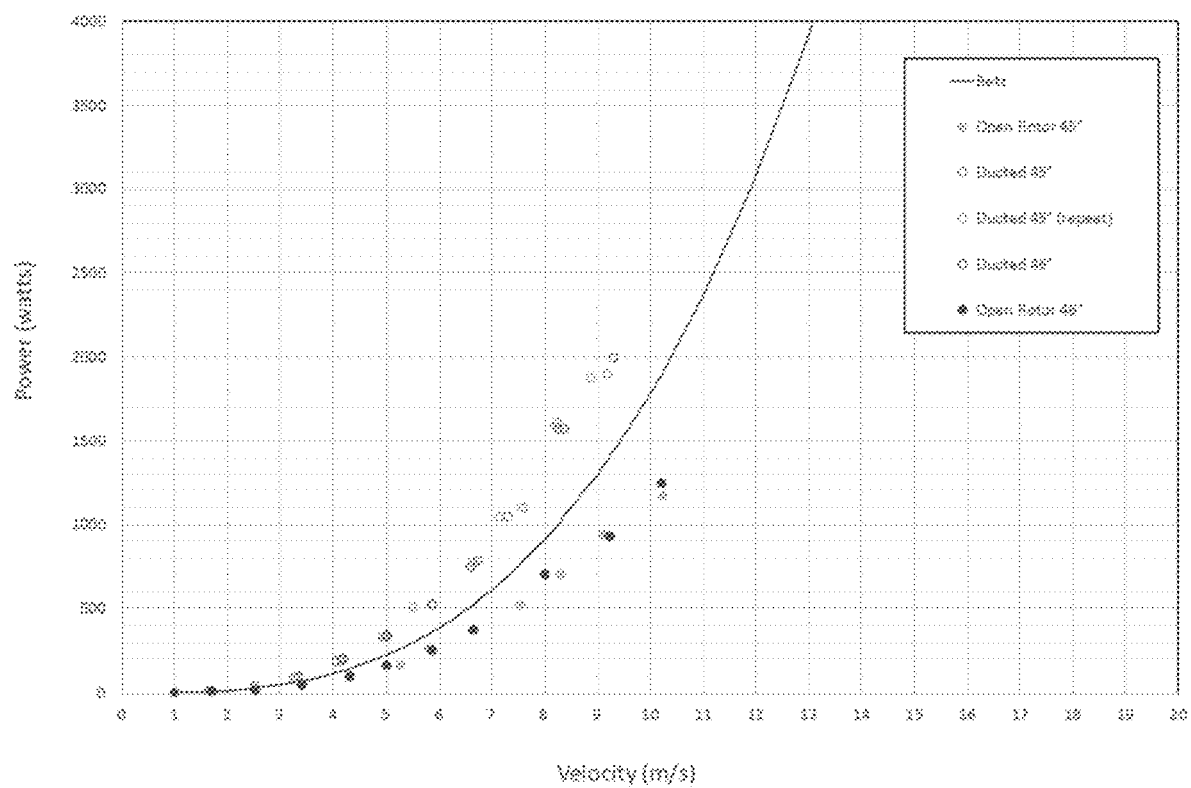
FIG. 18 is a graph of experimental data illustrating increased power output of the ducted wind turbine when the blades are optimized to account for the varying velocity field in the duct, in accordance with an embodiment.

A plot of the experimental data illustrating the increased power output of the ducted wind turbine when the blades are optimized to account for the varying velocity field in the duct and the rotor placed aft of the narrowest part of the duct is illustrated in FIG. 18. The solid circles represent data points for two un-ducted rotor configurations operating at maximum power output across a range of wind speeds. The solid line represents the theoretical limit for an un-ducted, open rotor design. The open circles illustrate the maximum power output for the same two rotors in a ducted configuration across the range of wind speeds. It is clear from the experimental data that the presence of the duct serves to increase to increase the power output by a factor of approximately 2 across the speed range.

Figure 19:
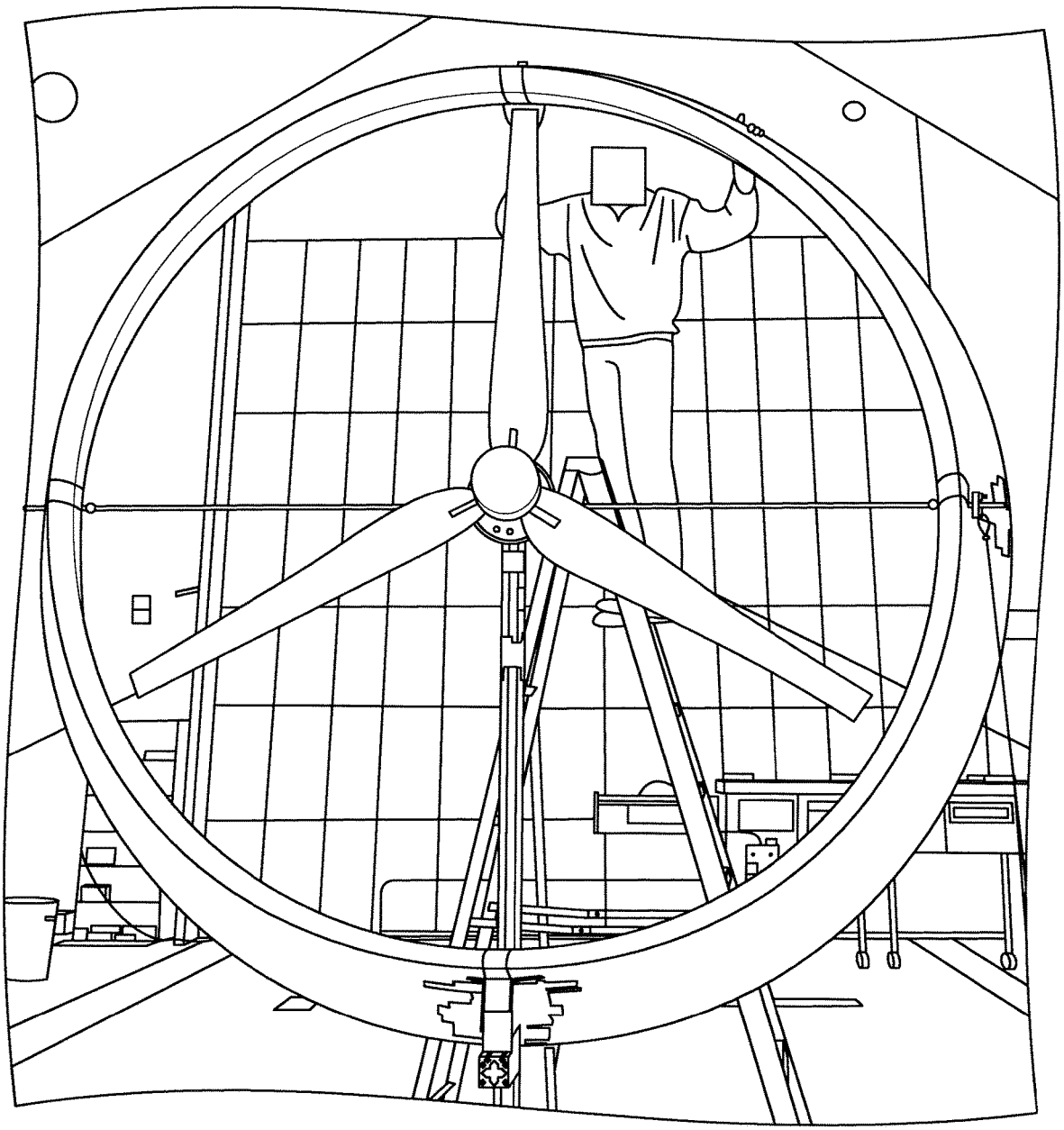
FIG. 19 is an image of a ducted wind turbine based on the aforementioned geometry being tested in the wind tunnel, in accordance with an embodiment.

Referring to FIG. 19, in one embodiment, is an image of a portion of a turbine system utilized to generate data shown in FIG. 18. According to an embodiment, the duct geometry of the turbine system depicted in FIG. 19 is shown in FIGS. 7 and 8, and the rotor details are shown in FIGS. 13-17. Although FIG. 19 depicts one embodiment of a portion of a turbine system, many other embodiments are possible.

While this invention has been particularly shown and described with references to example embodiments thereof, it will be understood by those skilled in the art that various changes in form and details may be made therein without departing from the scope of the invention encompassed by the appended claims.

What is claimed is:

1. A wind energy power generating device, comprising:
    a duct extending a predetermined distance along a longitudinal axis and comprising: (i) a forward lifting surface having a first leading edge extending in a first plane transverse to said longitudinal axis and a first trailing edge extending in a second plane that is laterally spaced from and parallel to said first plane and being of a first maximum diameter that is positioned in said second plane coincident with said first trailing edge and a first minimum diameter that is positioned in a third plane that is parallel to and spaced between said first plane and said second plane; and (ii) an aft lifting surface having a second leading edge extending in a fourth plane that is parallel to and spaced laterally from said second plane and a second trailing edge extending in a fifth plane that is parallel to and laterally spaced from said fourth plane and being of a second minimum diameter less than said maximum diameter, said forward lifting surface and said aft lifting surface being concentrically mounted in concentrically spaced relation to one another and with said fourth plane positioned between said first and second planes and said fifth plane positioned aft of said fourth plane; and
    a primary rotor mounted within said duct for rotation about said longitudinal axis and positioned aft of said first minimum diameter.

2. The wind energy power generating device of claim 1, wherein said rotor is positioned between said first minimum diameter and 70% of said predetermined distance.

3. The wind energy power generating device of claim 1, wherein said rotor is positioned between 55% and 65% of said predetermined distance as measured from said first leading edge.

4. A wind energy power generating device, comprising:
    a duct extending a predetermined distance along a longitudinal axis and comprising a forward lifting surface having a first leading edge extending in a first plane transverse to said longitudinal axis and a first trailing edge extending in a second plane that is laterally spaced from and parallel to said first plane and being of a first maximum diameter that is positioned in said second plane coincident with said first trailing edge and a first minimum diameter that is positioned in a third plane that is parallel to and spaced between said first plane and said second plane; and
    a primary rotor mounted within said duct for rotation about said longitudinal axis and positioned between said second and third planes.

5. The wind energy power generating device of claim 4, wherein said rotor is positioned between said first minimum diameter and 70% of said predetermined distance.

6. The wind energy power generating device of claim 4, wherein said rotor is positioned between 55% and 65% of said predetermined distance as measured from said first leading edge.

7. A turbine device, comprising:
    a first circular duct extending along a longitudinal axis from a leading edge to a trailing edge and comprising an outer surface and an inner surface, a diameter of the inner surface increasing from a minimum diameter near the leading edge to a maximum diameter near the trailing edge; and
    a primary rotor mounted within the first circular duct and configured to rotate about the longitudinal axis, wherein the rotor is mounted at a position within the first circular duct wherein the diameter of the inner surface is greater than the minimum diameter.

8. The turbine device of claim 7, wherein the device further comprises:
    a second circular duct extending along the longitudinal axis from a second duct leading edge to a second duct trailing edge and comprising an outer surface and an inner surface, wherein at least a portion of the first circular duct trailing edge is positioned within the second duct leading edge, and wherein a diameter of the inner surface of the second duct leading edge is greater than a diameter of the outer surface of the first duct, thereby creating a gap between the outer surface of the first circular duct and the inner surface of the second circular duct.

9. The turbine device of claim 7, wherein the rotor is positioned in front of the trailing edge of the first duct.

10. A duct assembly, comprising:
    a first circular duct extending along a longitudinal axis from a leading edge to a trailing edge and comprising an outer surface and an inner surface, a diameter of the inner surface increasing from a minimum diameter near the leading edge to a maximum diameter near the trailing edge, wherein the duct is configured for a rotor to be mounted within the duct to rotate about the longitudinal axis, at a position within the first circular duct wherein the diameter of the inner surface is greater than the minimum diameter.

11. The duct assembly of claim 10, wherein the assembly further comprises:
a second circular duct extending along the longitudinal axis from a second duct leading edge to a second duct trailing edge and comprising an outer surface and an inner surface, wherein at least a portion of the first circular duct trailing edge is positioned within the second duct leading edge, and wherein a diameter of the inner surface of the second duct leading edge is greater than a diameter of the outer surface of the first duct, thereby creating a gap between the outer surface of the first circular duct and the inner surface of the second circular duct.

12. The wind energy power generating device of claim 1, wherein the primary rotor includes an elongate blade that includes a tip region and is twisted along its length with the amount of twist reducing over the majority of the blade's length but increasing towards the tip as well as a chord that increases towards the tip.

13. The wind energy power generating device of claim 4, wherein the primary rotor includes an elongate blade that includes a tip region and is twisted along its length with the amount of twist reducing over the majority of the blade's length but increasing towards the tip as well as a chord that increases towards the tip.

14. The turbine device of claim 7, wherein the primary rotor includes an elongate blade that includes a tip region and is twisted along its length with the amount of twist reducing over the majority of the blade's length but increasing towards the tip as well as a chord that increases towards the tip.

* * * * *